United States Patent
Inami et al.

(10) Patent No.: US 10,190,935 B2
(45) Date of Patent: Jan. 29, 2019

(54) GAS LEAK DETECTION DEVICE AND GAS LEAK DETECTION METHOD

(71) Applicant: Hitachi, Ltd., Chiyoda-ku, Tokyo (JP)

(72) Inventors: Hisao Inami, Tokyo (JP); Makoto Hirose, Tokyo (JP); Hiroyuki Nakamichi, Tokyo (JP); Masaru Tatemi, Tokyo (JP); Toshiaki Rokunohe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 102 days.

(21) Appl. No.: 15/216,736

(22) Filed: Jul. 22, 2016

(65) Prior Publication Data

US 2017/0030799 A1 Feb. 2, 2017

(30) Foreign Application Priority Data

Jul. 28, 2015 (JP) .................................. 2015-148288

(51) Int. Cl.
  *G01M 3/32* (2006.01)
  *H02B 7/01* (2006.01)
  *H02B 13/065* (2006.01)

(52) U.S. Cl.
  CPC ...... *G01M 3/3263* (2013.01); *H02B 13/0655* (2013.01); *H02B 13/065* (2013.01)

(58) Field of Classification Search
  CPC ............... G01M 3/3263; H02B 13/065; H02B 13/0655
  USPC .......................... 702/47, 51, 98, 99, 130, 50
  See application file for complete search history.

(56) References Cited

U.S. PATENT DOCUMENTS

| 4,394,635 A | 7/1983 | Foss |
| 5,065,350 A * | 11/1991 | Fedder ............... G01M 3/3263 702/51 |
| 2009/0164148 A1 | 6/2009 | Shinoda |
| 2011/0153232 A1 | 6/2011 | Ito |

FOREIGN PATENT DOCUMENTS

| JP | 2-7829 A | 1/1990 |
| JP | 4-192509 A | 7/1992 |
| JP | 9-200918 A | 7/1997 |
| JP | 2005-163601 A | 6/2005 |

(Continued)

OTHER PUBLICATIONS

English Translation of Japanese Office Action issued in counterpart Japanese Application No. 2015-148288 dated Nov. 14, 2018 (three (3) pages).

*Primary Examiner* — John H Le
(74) *Attorney, Agent, or Firm* — Crowell & Moring LLP

(57) ABSTRACT

A gas leak detection device includes a learning section, which has a correlation between a gas temperature inside gas pressure containers and a surface temperature of the gas pressure containers in a learning period corresponding to a current value flowing in the conductor, to make database, and a diagnosis section, which extracts a gas temperature corresponding to the measured current value and the surface temperature from the learning section in a diagnosis period, corrects a gas pressure value corresponding to an arbitrary surface temperature to a gas pressure value of a reference temperature using the extracted gas temperature, and detects a leak of the insulating gas based on the corrected gas pressure value.

6 Claims, 16 Drawing Sheets

(56) References Cited

FOREIGN PATENT DOCUMENTS

| JP | 2007-263584 | 10/2007 |
| JP | 2009-150785 A | 7/2009 |
| JP | 2010-193616 A | 9/2010 |
| JP | 2011-130581 A | 6/2011 |
| JP | 2014-53337 A | 3/2014 |

* cited by examiner

FIG. 2

| TIME | PRESSURE [Pa] | TEMPERATURE OF CONTAINER [K] |
|---|---|---|
| 0:00 | ○○ | ○○ |
| 1:00 | ○○ | ○○ |
| 2:00 | ○○ | ○○ |
| 3:00 | ○○ | ○○ |
| 4:00 | ○○ | ○○ |
| 5:00 | ○○ | ○○ |
| 6:00 | ○○ | ○○ |
| 7:00 | ○○ | ○○ |
| 8:00 | ○○ | ○○ |
| 9:00 | ○○ | ○○ |
| 10:00 | ○○ | ○○ |
| 11:00 | ○○ | ○○ |
| 12:00 | ○○ | ○○ |
| 13:00 | ○○ | ○○ |
| 14:00 | ○○ | ○○ |
| 15:00 | ○○ | ○○ |
| 16:00 | ○○ | ○○ |
| 17:00 | ○○ | ○○ |
| 18:00 | ○○ | ○○ |
| 19:00 | ○○ | ○○ |
| 20:00 | ○○ | ○○ |
| 21:00 | ○○ | ○○ |
| 22:00 | ○○ | ○○ |
| 23:00 | ○○ | ○○ |

FIG. 3

| TIME | PRESSURE [Pa] | TEMPERATURE OF CONTAINER [K] | CURRENT [A] | GAS TEMPERATURE [K] |
|---|---|---|---|---|
| 0:00 | OO | OO | OO | OO |
| 1:00 | OO | OO | OO | OO |
| 2:00 | OO | OO | OO | OO |
| 3:00 | OO | OO | OO | OO |
| 4:00 | OO | OO | OO | OO |
| 5:00 | OO | OO | OO | OO |
| 6:00 | OO | OO | OO | OO |
| 7:00 | OO | OO | OO | OO |
| 8:00 | OO | OO | OO | OO |
| 9:00 | OO | OO | OO | OO |
| 10:00 | OO | OO | OO | OO |
| 11:00 | OO | OO | OO | OO |
| 12:00 | OO | OO | OO | OO |
| 13:00 | OO | OO | OO | OO |
| 14:00 | OO | OO | OO | OO |
| 15:00 | OO | OO | OO | OO |
| 16:00 | OO | OO | OO | OO |
| 17:00 | OO | OO | OO | OO |
| 18:00 | OO | OO | OO | OO |
| 19:00 | OO | OO | OO | OO |
| 20:00 | OO | OO | OO | OO |
| 21:00 | OO | OO | OO | OO |
| 22:00 | OO | OO | OO | OO |
| 23:00 | OO | OO | OO | OO |

FIG. 4

| CURRENT [A] | TEMPERATURE OF CONTAINER [K] | GAS TEMPERATURE [K] |
|---|---|---|
| 1~100 | OO | OO |
| | OO | OO |
| | OO | OO |
| 101~200 | OO | OO |
| | OO | OO |
| | OO | OO |
| 201~300 | OO | OO |
| | OO | OO |
| | OO | OO |
| 301~400 | OO | OO |
| | OO | OO |
| | OO | OO |
| 401~500 | OO | OO |
| | OO | OO |
| | OO | OO |
| 501~600 | OO | OO |
| | OO | OO |
| | OO | OO |
| 601~700 | OO | OO |
| | OO | OO |
| | OO | OO |
| 701~800 | OO | OO |
| | OO | OO |
| | OO | OO |

FIG. 6

| DATE | PRESSURE [Pa] | TEMPERATURE OF CONTAINER [K] | CURRENT [A] |
|---|---|---|---|
| ○○/△/□□ | P1 | Ttank1 | I1 |
| ○○/△/□□ | P2 | Ttank2 | I2 |
| ○○/△/□□ | P3 | Ttank3 | I3 |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |
| ○○/△/□□ | ○○ | ○○ | ○○ |

FIG. 7

| DATE | PRESSURE [Pa] | GAS TEMPERATURE [K] |
|---|---|---|
| ○○/△/□□ | P1 | Tgas1 |
| ○○/△/□□ | P2 | Tgas2 |
| ○○/△/□□ | P3 | Tgas3 |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |
| ○○/△/□□ | ○○ | ○○ |

FIG. 8

| DATE | CORRECTED GAS PRESSURE [Pa] |
|---|---|
| ○○/△/□□ | $P_{20}^1$ |
| ○○/△/□□ | $P_{20}^2$ |
| ○○/△/□□ | $P_{20}^3$ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |
| ○○/△/□□ | ○○ |

GAS LEAK DETECTION DEVICE AND GAS LEAK DETECTION METHOD

BACKGROUND OF THE INVENTION

Field of the Invention

The present invention relates to a gas leak detection device of gas insulation electric equipment which detects a very small leakage of insulating gas sealed in an airtight container such as a gas insulation switching device, and a gas leak detection method (inspection method) thereof.

Background Art

A gas insulation switching device is a facility which cuts off current instantly in order to protect facilities of an electric power substation, in a case in which abnormal current such as a lightning strike flows. The gas insulation switching device has a structure in which a plurality of gas pressure containers are connected, and a breaker or a disconnecting switch is housed within the gas pressure containers with inert gas. As insulating gas sealed in the gas pressure containers, inert gas is used. As the inert gas, sulfur hexafluoride gas (hereinafter, abbreviate to $SF_6$) is generally used. $SF_6$ is a subject to be managed because the global warming potential is 24,000 times more than $CO_2$, and gas insulation electric equipment including the gas insulation switching device needs to detect a gas leak.

A technology relating to detection of a gas leak of the related art is disclosed in JP-A-2010-193616 (PTL 1). This document focuses on that gas pressure is slowly changed following a change of an external temperature (refer to paragraph 0013 and FIG. 3), and a method of obtaining a conversion pressure converted at a predetermined temperature, by providing temperature sensors that are provided on the outside of the gas pressure containers, and using a temperature value (external temperature) measured at an arbitrary timing and a pressure value (gas pressure) measured when a predetermined delay time has elapsed from the timing (refer to abstract).

In addition, a technology relating to detection of a gas leak of the related art is disclosed in JP-A-2011-130581 (PTL 2). In this document, a gas pressure monitoring device is disclosed in which a conversion pressure inside the airtight container is accurately obtained and is capable of early detection of a gas leak, by removing an influence of uncertain temperature differences inside and outside the airtight container (gas pressure containers), from an inclination of a characteristic curve constituted of transitions in time series of a pressure value and a temperature value measured at a predetermined timing defined to a 24 hour circle (refer to abstract). Further, the document discloses that temperatures inside and outside the airtight container are measured, a characteristic curve obtained by combining a pressure value and a temperature value (any one of an internal temperature and an external temperature of the airtight container) measured at a timing when a difference between two temperatures is small is used, and an inclination of a characteristic curve having high reproducibility is obtained (refer to paragraph 0022).

SUMMARY OF THE INVENTION

In order to detect a gas leak, that is, to monitor an amount of gas over time, gas pressure is generally measured. However, the gas pressure is largely changed due to a gas temperature. As a cause of changing the gas temperature, in addition to an influence of a change of an environmental temperature as disclosed in JP-A-2010-193616 and JP-A-2011-130581, it is exemplified that an amount of generation of heat of the conductor is changed by changing the energizing condition (energizing current value) to the gas insulation switching device. Therefore, a change of the gas pressure caused by a change of the gas temperature due to a change of an energizing condition is corrected, and a gas pressure in a reference temperature (for example, 20° C.) is required to be converted.

In a method disclosed in JP-A-2010-193616, a relationship between an external temperature and a gas pressure of a gas pressure container is related to a delay time, and the gas pressure is corrected to an external temperature. However, there is no consideration of a change of the gas temperature due to a change of the energizing condition. In addition, the external temperature and the gas pressure are not easily corresponded to each other, and an error is likely to occur in the gas pressure corrected using an external temperature.

In a gas pressure monitoring device disclosed in JP-A-2011-130581, an increase and decrease of $SF_6$ gas sealed within the gas pressure container can be known from an inclination of a characteristic curve without obtaining a conversion pressure. However, in order to obtain the conversion pressure, there is no consideration that a change of the gas temperature due to a change of the energizing condition is considered. Also, in the gas pressure monitoring device disclosed in JP-A-2011-130581, a temperature inside the gas pressure containers is measured at one position. A temperature distribution is generated due to gas convection in the gas pressure containers, and a gas temperature is not uniform. When the gas pressure is corrected, an average gas temperature is necessary, but if the temperature inside the container is measured at one position, the average gas temperature cannot be obtained. In addition, the gas insulation switching device is configured with a plurality of the gas pressure containers, and thus it is not realistic from a point of view of cost in that temperature sensors are provided inside all of the gas pressure containers so as to measure internal temperatures.

The invention is provided to be able to detect a leak of insulating gas such as $SF_6$ with high accuracy by correcting a temperature of a gas pressure in consideration of the energizing condition which largely affects the gas temperature inside the gas pressure container.

According to an aspect of the present invention, there is provided a gas leak detection device which is used for gas insulation electric equipment in which a conductor is installed inside a gas pressure container where insulating gas is sealed, and detects a leak of the insulating gas, including, a pressure sensor that measures a gas pressure value inside the gas pressure container, and a temperature sensor that measures an external temperature of the gas pressure container having a correlation of a gas temperature inside the gas pressure container, and the gas leak detection device, which corrects a gas pressure value measured by the pressure sensor to a gas pressure value of a reference temperature based on an external temperature measured by the temperature sensor and detects a leak of the insulating gas based on the corrected gas pressure value, includes a current data capturing section that captures a current value flowing in the conductor, a learning section that has a correlation between a gas temperature inside the gas pressure container and an external temperature of the gas pressure container corresponding to the current value to make database in a learning period, and a diagnosis section that extracts a gas temperature corresponding to the measured current value and an external temperature of the gas pressure container from the learning section in a diagnosis period, corrects the gas pressure value corresponding to the external temperature using the gas temperature to the gas pressure value of the reference temperature, and detects a leak of the insulating gas based on the corrected gas pressure value.

According to the another aspect of the present invention, there is provided a gas leak detection method which is used for gas insulation electric equipment in which a conductor is installed inside a gas pressure container where insulating gas is sealed, and detects a gas leak from the gas pressure containers by measuring a gas pressure value inside the gas pressure container, including, measuring the gas pressure value inside the gas pressure container by a pressure sensor, measuring an external temperature of the gas pressure container having a correlation of a gas temperature inside the gas pressure container by the temperature sensor, obtaining a current value flowing in the conductor through a current data capturing section, storing a correlation in a database by creating the correlation between a gas temperature and an external temperature of the gas pressure container corresponding to the current value in a learning period, extracting the correlation between the gas temperature and the external temperature of the gas pressure container corresponding to the current value measured in a diagnosis period from the database, obtaining the gas temperature from the external temperature of the gas pressure container measured using the correlation between the gas temperature and the external temperature of the gas pressure container in the database, correcting the gas pressure value measured using the gas temperature to a gas pressure value in a reference temperature, linear-regressing the corrected gas pressure value, and determining whether or not an inclination of the regression straight line is more than an inclination of a gas leak straight line of a regulated allowable concentration, in which, in a case in which the inclination of the regression straight line is more than the inclination of the gas leak straight line of the regulated allowable concentration, it is determined whether or not gas is leaked.

According to the invention, the temperature of the gas pressure value is corrected in consideration of the energizing condition, and the leak of the insulating gas such as $SF_6$ can be detected with high accuracy.

Problems, configurations, and effects other then the above description are apparent according to the following description of embodiments.

BRIEF DESCRIPTION OF THE DRAWINGS

FIG. 2 is a diagram illustrating an example of a measured data format recorded in a learning data recording section in the first example of the invention.

FIG. 3 is a diagram illustrating an example of a data format recorded in a gas temperature calculation section in the first example of the invention.

FIG. 4 is a diagram illustrating an example of a data format recorded in a gas temperature DB in the first example of the invention.

FIG. 6 is a diagram illustrating an example of a measured data format recorded in an diagnosis data recording section in the first example of the invention.

FIG. 7 is a diagram illustrating an example of a data format recorded in a gas temperature extracting section in the first example of the invention.

FIG. 8 is a diagram illustrating an example of a data format recorded in a pressure calculation section in the first example of the invention.

DETAILED DESCRIPTION OF THE INVENTION

Hereinafter, embodiments of the invention will be described with reference to drawings. Also, as an example of the embodiments to be described later, other embodiments which are embodied by combining of each embodiment, and combining or replacing of common or well-known technologies are also possible.

FIRST EXAMPLE

Figure 1:
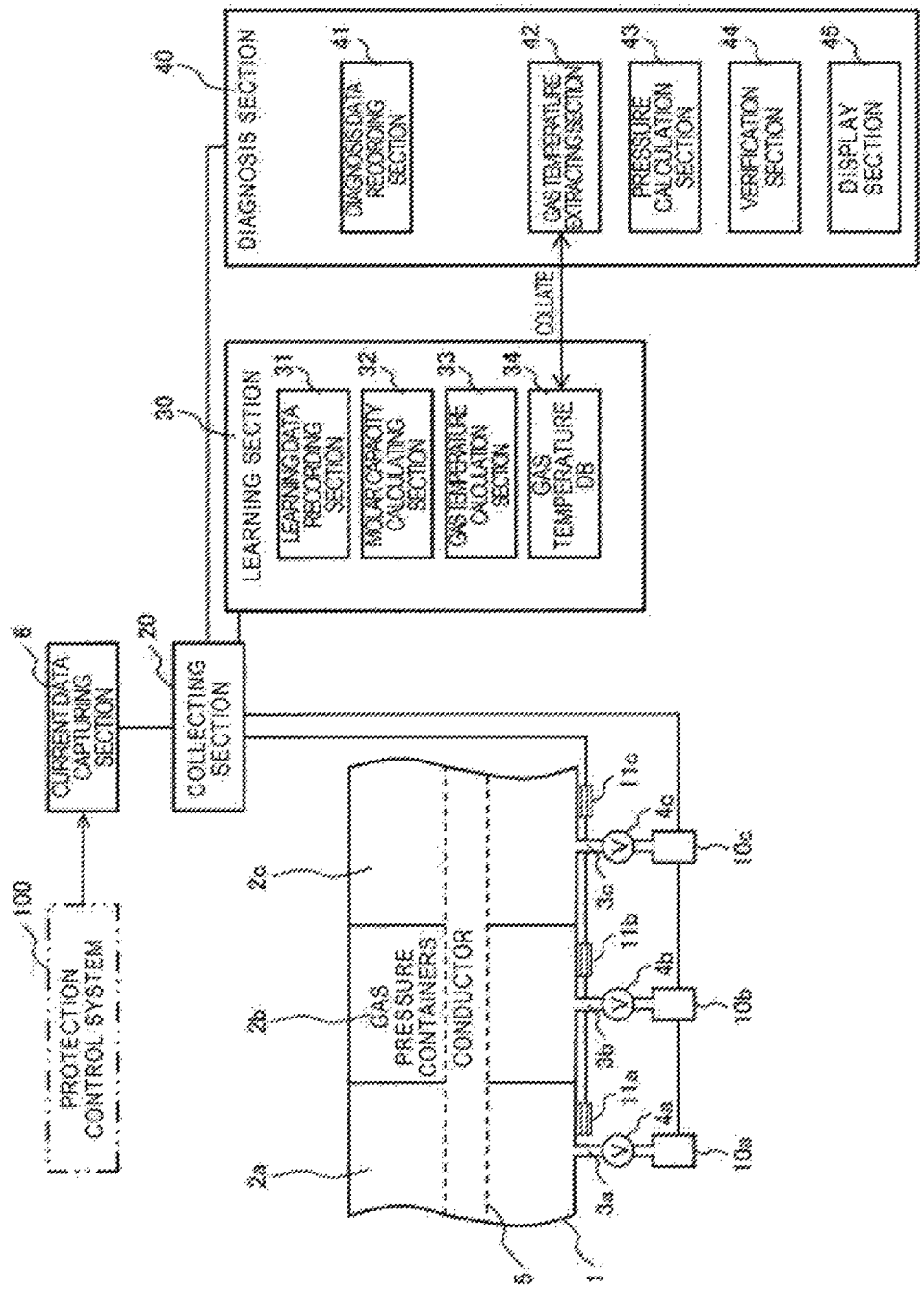
FIG. 1 is a configuration diagram of a gas leak detection device according to a first example of the invention.

FIG. 1 is a configuration diagram of a gas leak detection device according to a first example of the invention.

As illustrated in FIG. 1, the gas insulation switching device 1 is configured with a plurality of gas pressure containers 2a to 2c which are linked, and a conductor 5 penetrates the center thereof in a coaxial direction of the gas pressure containers 2a to 2c (a direction where the gas pressure containers 2a to 2c are arranged). A current data capturing section 6 captures a current value flowing in the conductor 5 from a protection control system 100 of an electric power substation. The current data capturing section 6 is connected to the protection control system 100 through a wired (communication wire) or wireless communication system.

In the gas pressure containers 2a to 2c, insulating gas $SF_6$ of a predetermined gas pressure is sealed. Insulating gas such as $SF_6$ has high electric insulation properties. In order to perform monitoring of a gas pressure in the gas pressure containers 2a to 2c, gas pressure sensors 10a to 10c are connected thereto through pipes 3a to 3c and valves 4a to 4c. A gas pressure (gas pressure value) inside the gas pressure containers 2a to 2c is measured using the gas pressure sensors 10a to 10c.

Temperature sensors 11a to 11c are disposed on surfaces of the gas pressure containers 2a to 2c, and a surface temperature of each of the gas pressure containers 2a to 2c is measured. Moreover, in consideration of an effect of direct sunlight, it is preferable that a surface temperature is measured in a region half of a ground side of the gas pressure containers 2a to 2c, and it is more preferable that a surface temperature is measured at a bottom portion (lowest portion) of the gas pressure containers 2a to 2c. Since the temperature sensors 11a to 11c are installed on surfaces of the gas pressure containers 2a to 2c, a gas leak detection device according to the example can be easily added to existing facilities or equipment.

A collecting section 20 is connected to the gas pressure sensors 10a to 10c, the temperature sensors 11a to 11c, and the current data capturing section 6 through a wired (communication wire) or wireless communication system (not illustrated). The collecting section 20 periodically collects data of various sensors and writes the data on a learning section 30 or a diagnosis section 40. The collecting section 20 includes an A/D convertor which converts an analog signal to a digital signal.

The learning section 30 is configured with a learning data recording section 31, a molar capacity calculating section 32, a gas temperature calculation section 33, and a gas temperature DB 34.

The learning data recording section 31 is connected to the collecting section 20. In the learning data recording section 31, a gas pressure collected at the time of non-loading (to be described later) of a learning period and surface temperatures of the gas pressure containers 2a to 2c are recorded. Here, non-loading timing means a state in which current does not flow in the conductor 5.

The molar capacity calculating section 32 calculates a molar capacity of gas using the gas pressure and the surface temperature of the gas pressure containers 2a to 2c described above.

The gas temperature calculation section 33 calculates the gas temperature using the gas pressure, which is collected at the time of energizing (to be described later) of the learning period, and the molar capacity recorded in the molar capacity calculating section 32. Here, energizing timing means a state in which current flows in the conductor 5.

In the gas temperature DB 34, a relationship (correlation) between the gas temperature calculated by the gas temperature calculation section 33 and the surface temperature of the gas pressure containers 2a to 2c is recorded as a database.

The diagnosis section 40 is configured with an diagnosis data recording section 41, a gas temperature extracting section 42, a pressure calculation section 43, a verification section 44, and a display section 45.

The diagnosis data recording section 41 is connected to the collecting section 20. In the diagnosis data recording section 41, the gas pressure collected in a diagnosis period (to be described later), the surface temperature of the gas pressure containers 2a to 2c, and a current value flowing in the conductor 5 are recorded.

The gas temperature extracting section 42 is connected to the gas temperature DB 34 and the diagnosis data recording section 41. The gas temperature extracting section 42 extracts the relationship between the gas temperatures and the surface temperatures of the gas pressure containers 2a to 2c corresponding to the current value recorded in the diagnosis data recording section 41 from the gas temperature DB 34. The relationship between the extracted gas temperatures and the surface temperatures of the gas pressure containers 2a to 2c is used, and thus a gas temperature corresponding to a surface temperature of gas pressure containers recorded in the diagnosis data recording section 41 is obtained.

The pressure calculation section 43 corrects the gas pressure to a gas pressure of a reference temperature (for example, 20° C.), using the gas temperature.

The verification section 44 verifies whether or not a change with time of a corrected gas pressure, in which the temperature is corrected as described above, is more than a gas leak of a specific concentration.

The display section 45 displays a change with time of the corrected gas pressure.

The molar capacity calculating section 32, the gas temperature calculation section 33, the gas temperature extracting section 42, the pressure calculation section 43, and the verification section 44 described above are processing sections which perform each process. The processing section is configured with one or a plurality of calculation processing devices (CPU), and a program executed by the calculation processing device in order to perform a process of each processing section. That is, a process of each section may be performed in one calculation processing device provided in the learning section 30, or the process of each processing section may be divided into a plurality of calculation processing devices. In a case in which the process of each processing section is divided into a plurality of the calculation processing devices, one calculation processing device may execute processes of a plurality of the processing sections.

Figure 9:
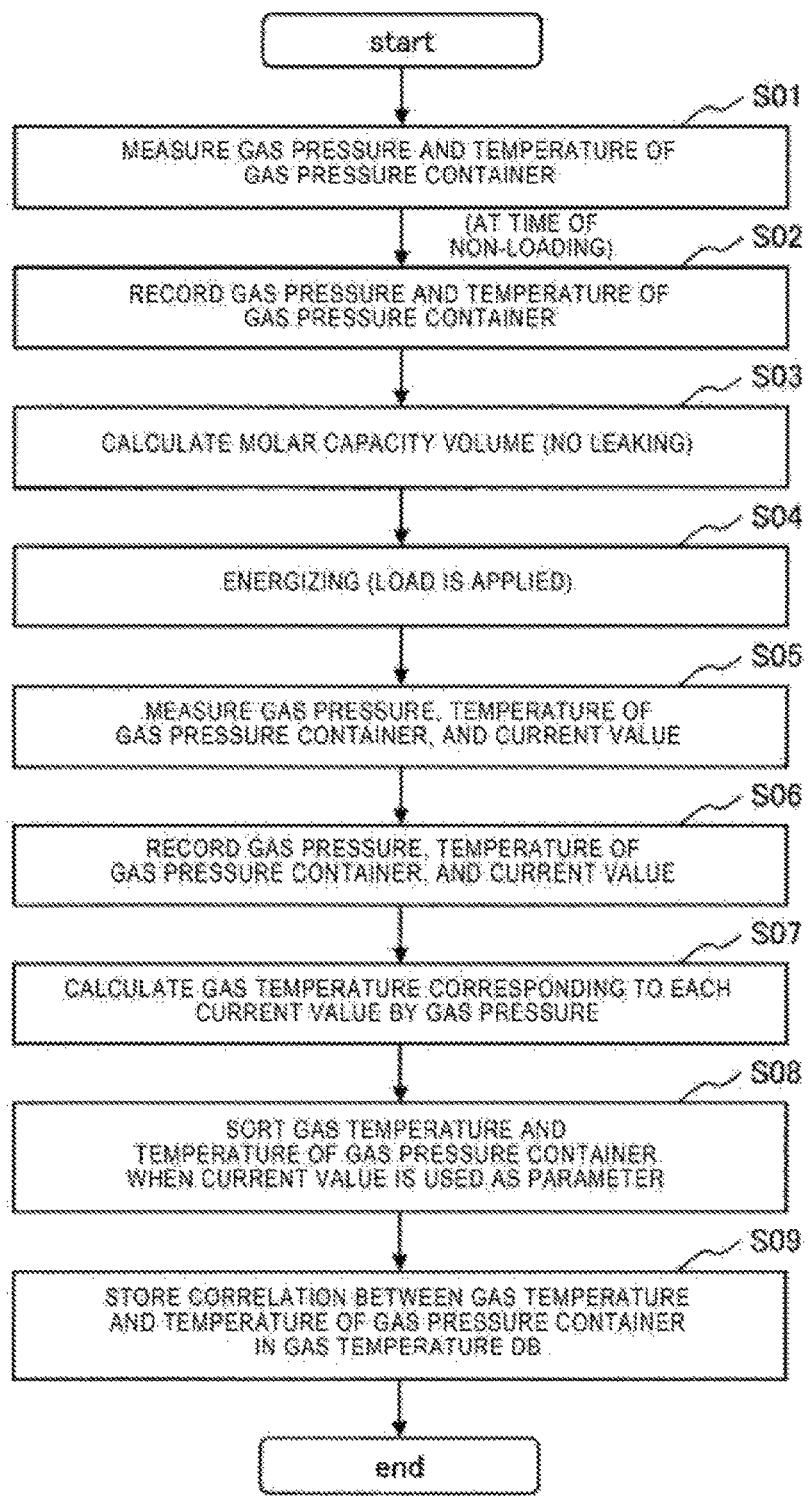
FIG. 9 is a block diagram illustrating a detection flow of a gas leak in a learning period in the first example of the invention.
Figure 10:
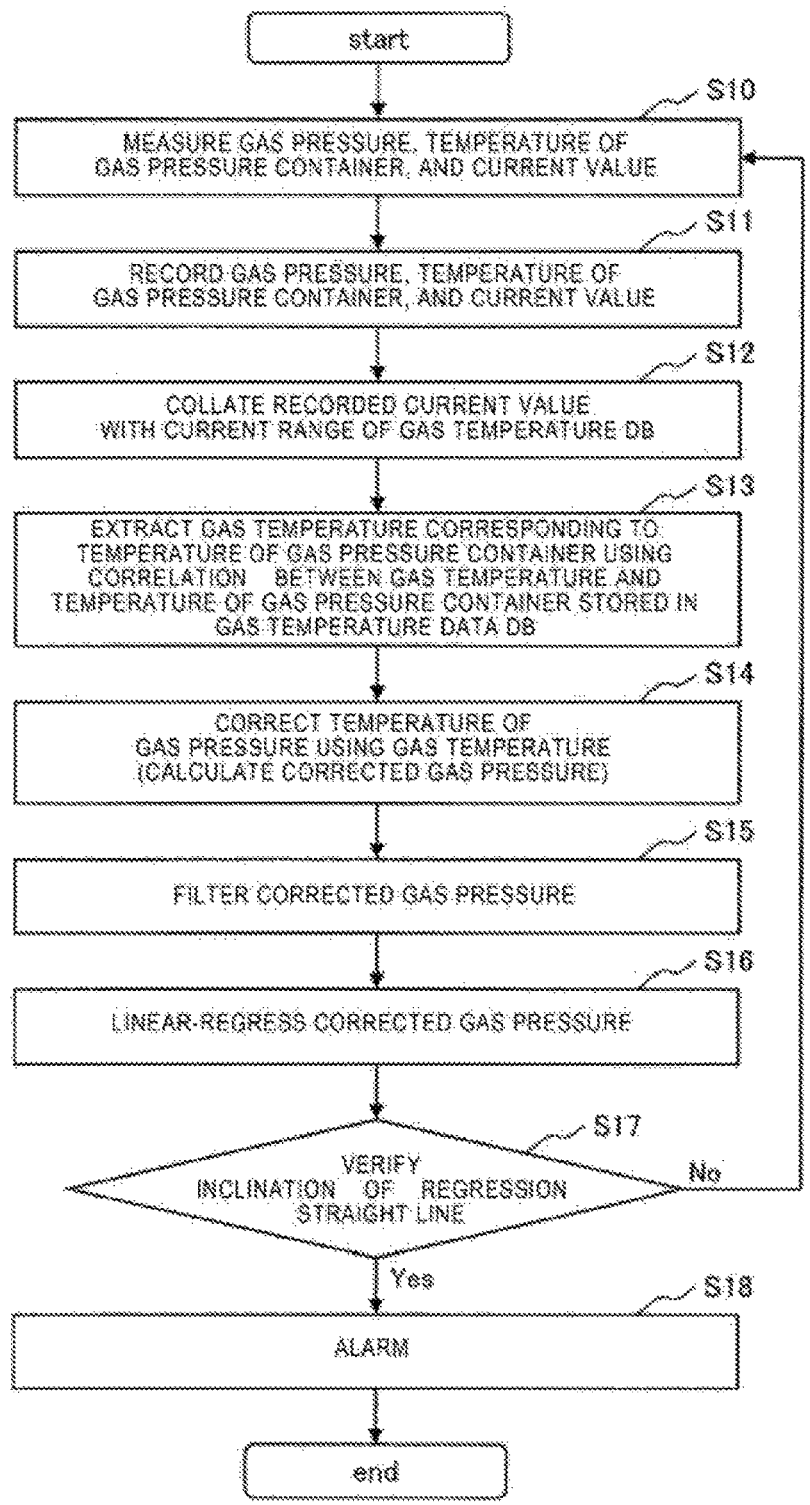
FIG. 10 is a block diagram illustrating a detection flow of a gas leak in a diagnostic period in the first example of the invention.

Next, a detection flow of a gas leak will be described with reference to FIG. 9 and FIG. 10. FIG. 9 is a block diagram illustrating a detection flow of a gas leak in a learning period in the first example of the invention. FIG. 10 is a block diagram illustrating a detection flow of a gas leak in a diagnostic period in the first example of the invention.

Detecting of a gas leak is performed respectively in a learning period (FIG. 9: Steps 1 to 9) and a diagnosis period (FIG. 10: Steps 10 to 18).

Step 1

In a condition of non-loading in which current does not flow, the gas pressure inside the gas pressure containers 2a to 2c is measured by the gas pressure sensors 10a to 10c. Otherwise, the surface temperatures of the gas pressure containers 2a to 2c are measured by the temperature sensors 11a to 11c. At this time, when the temperature sensors 11a to 11c are installed in the bottom portion of the gas pressure containers 2a to 2c, the temperature sensors are not easily affected by solar irradiation, and it is possible to obtain more accurate surface temperatures. The collecting section 20 periodically collects data of various sensors, and A/D converts an analog signal to a digital signal.

Step 2

The gas pressure inside the gas pressure containers 2a to 2c and the surface temperature of the gas pressure containers 2a to 2c collected in Step 1 are transferred from the collecting section 20 to the learning data recording section 31, and the gas pressure and the surface temperature of the gas pressure containers 2a to 2c are recorded in the learning data recording section 31 in time series as illustrated in FIG. 2. FIG. 2 is a diagram illustrating an example of the measured data format recorded in the learning data recording section in the first example of the invention.

Step 3

The molar capacity calculating section 32 calculates a molar capacity of gas using the gas pressure and the surface temperature of the gas pressure containers 2a to 2c recorded in the learning data recording section 31. The molar capacity is calculated using a state equation Beattie-Bridgeman of actual gas illustrated in Equation (1).

$$pv^2 = RT(v+B) - A \qquad (1)$$

Here, p is a gas pressure (Pa), v is a molar capacity (m³/mol), R is a constant of gas (8.31 J/mol·K), and T is a gas temperature (K). In a state of non-loading in which current does not flow, the surface temperature and the gas temperature of the gas pressure containers 2a to 2c substantially coincide with each other. Here, at the time of calculating the molar capacity, the surface temperature of the gas pressure container is used instead of a gas temperature.

A and B of Equation (1) are described as follows.

$$A = 15.78 \times 10^{-1}(1 - 0.1062 \times 10^{-3}/v) \quad (2)$$

$$B = 0.366 \times 10^{-3}(1 - 0.1236 \times 10^{-3}/v) \quad (3)$$

When Equation (2) and Equation (3) are substituted in Equation (1), as shown in Equation (4), the equations are rearranged as a cubic equation regarding the molar capacity V.

$$av^3 + bv^2 + cv + d = 0 \quad (4)$$

$$a = p$$

$$b = -8.3143T$$

$$c = 15.78 \times 10^{-1} - 3.043 \times 10^{-3}T$$

$$d = -1.679 \times 10^{-4} + 3.761 \times 10^{-7}T$$

Here, in this equation, $$e = \frac{3ac - b^2}{9a^2} \quad (5)$$

$$f = \frac{2b^3 - 9abc + 27a^2d}{27a^3}$$

$$\alpha, \beta = \frac{-f \pm \sqrt{|f^2 + 4e^3|}}{2}$$

$$\gamma = \sqrt[3]{\alpha} + \sqrt[3]{\beta}$$

the molar capacity v of the gas is obtained by Equation (6) using the quadratic formula of a cubic equation.

[Number 2]

$$v = \gamma - \frac{b}{3a} \quad (6)$$

After the molar capacity corresponding to the gas pressure and the surface temperature of the gas pressure containers 2a to 2c in time series is calculated, an average molar capacity is stored in the molar capacity calculating section 32.

Step 4

Next, current flows in the conductor 5 so as to be in an energizing state. Accordingly, a gas pressure in a different current value, and the surface temperatures of the gas pressure containers 2a to 2c can be obtained.

Step 5

In the energizing state, the gas pressure sensors 10a to 10c measure the gas pressures inside the gas pressure containers 2a to 2c. In addition, the temperature sensors 11a to 11c measure the surface temperatures of the gas pressure containers 2a to 2c. Further, a current value flowing in the conductor 5 is captured from the current data capturing section 6.

Step 6

The gas pressure measured in Step 5, and the surface temperatures and the current values of the gas pressure containers 2a to 2c are transferred to the gas temperature calculation section 33, and the gas pressures and the surface temperatures of the gas pressure containers 2a to 2c as illustrated in FIG. 3, and the current value are recorded in the gas temperature calculation section 33 in time series. FIG. 3 is a diagram illustrating an example of the data format recorded in the gas temperature calculation section in the first example of the invention. Moreover, the gas temperature is added to the next step.

Step 7

The gas temperature calculation section 33 calculates the gas temperature. A method of calculating the gas temperature is described as follows. When Equation (2) and Equation (3) are substituted in Equation (1), as Equation (7), the gas temperature T is expressed using the gas pressure p and the molar capacity v.

[Number 3]

$$T = \frac{pv^2 + a\left(1 - \dfrac{b}{v}\right)}{R\left\{v + c\left(1 - \dfrac{d}{v}\right)\right\}} \quad (7)$$

$$a = 1.578$$
$$b = 0.1062 \times 10^{-3}$$
$$c = 0.366 \times 10^{-3}$$
$$d = 0.1236 \times 10^{-3}$$

Also, a to d in Equation (7) have nothing to do with a to d in Equation (4).

The gas pressure recorded in Step 6 and the molar capacity recorded in the molar capacity calculating section 32 are substituted in Equation (7), and the gas temperature is obtained. The obtained gas temperature is added to a format of FIG. 3.

Step 8

In the gas temperature DB 34, regarding the surface temperature of the gas pressure containers 2a to 2c and the gas temperature stored in the gas temperature calculation section 33, the current values are sorted as a parameter (FIG. 4). FIG. 4 is a diagram illustrating an example of a data format recorded in the gas temperature DB in the first example of the invention. It is preferable that intervals of the current values are 100 A to 200 A. The sorted data is recorded in the gas temperature DB 34.

Step 9

Figure 5:
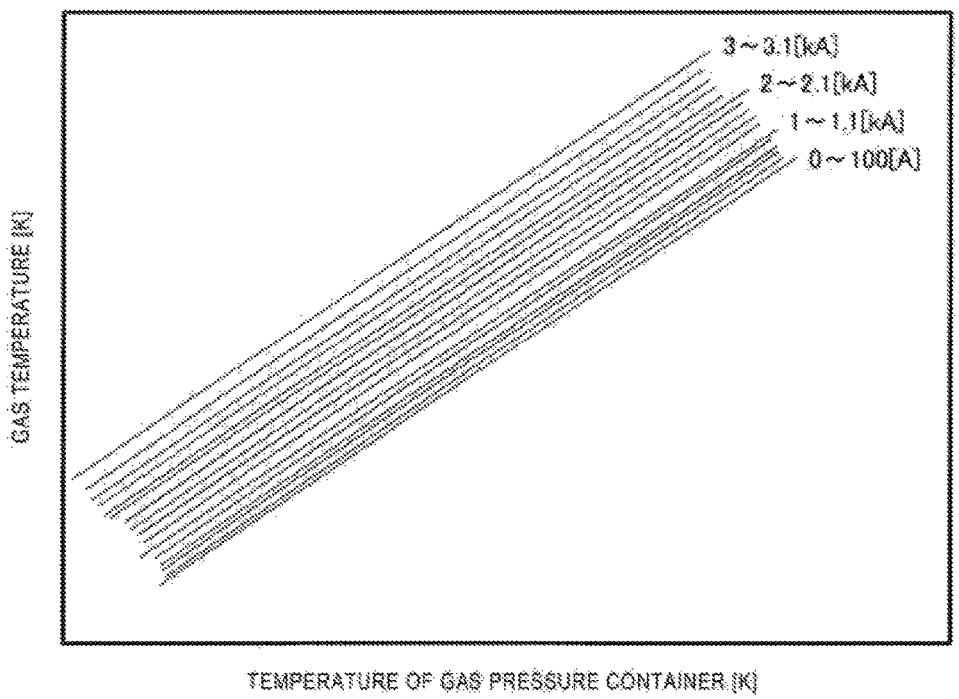
FIG. 5 is a diagram illustrating an example of a database recorded in the gas temperature DB in the first example of the invention.

Based on a relationship between the gas temperatures and the surface temperatures of the gas pressure containers 2a to 2c sorted in Step 8, a linear approximation line of the gas temperatures and the surface temperatures of the gas pressure containers 2a to 2c is recorded in the gas temperature DB 34 (FIG. 5). FIG. 5 is a diagram illustrating an example of a database recorded in the gas temperature DB in the first example of the invention.

In the example, the temperature sensors 11a to 11c are installed on a surface of the gas pressure containers 2a to 2c to detect the surface temperature of the gas pressure containers 2a to 2c. However, the temperatures detected by the temperature sensors 11a to 11c may be external temperatures of the gas pressure containers 2a to 2c having a correlation with the gas temperatures inside the gas pressure containers 2a to 2c.

Hitherto, in response to an energizing condition (current value), the correlation of the gas temperatures and the surface temperatures of the gas pressure containers is obtained in the learning period. After this step, a diagnosis period of a gas leak is carried out.

Step 10

In the energizing state, the gas pressure sensors 10a to 10c measure gas pressures inside the gas pressure containers 2a to 2c. In addition, the temperature sensors 11a to 11c measure the surface temperature of the gas pressure containers 2a to 2c. Further, the current value flowing in the conductor 5 is captured from the current data capturing section 6. The collecting section 20 periodically collects data of various sensors and A/D-converts the data.

Step 11

The gas pressures collected in Step 10, the surface temperatures of the gas pressure containers 2a to 2c, and the current value are transferred from the collecting section 20 to the diagnosis data recording section 41, and are recorded in time series as illustrated in FIG. 6. FIG. 6 is a diagram illustrating an example of the measured data format recorded in the diagnosis data recording section in the first example of the invention.

Step 12

Figure 11:
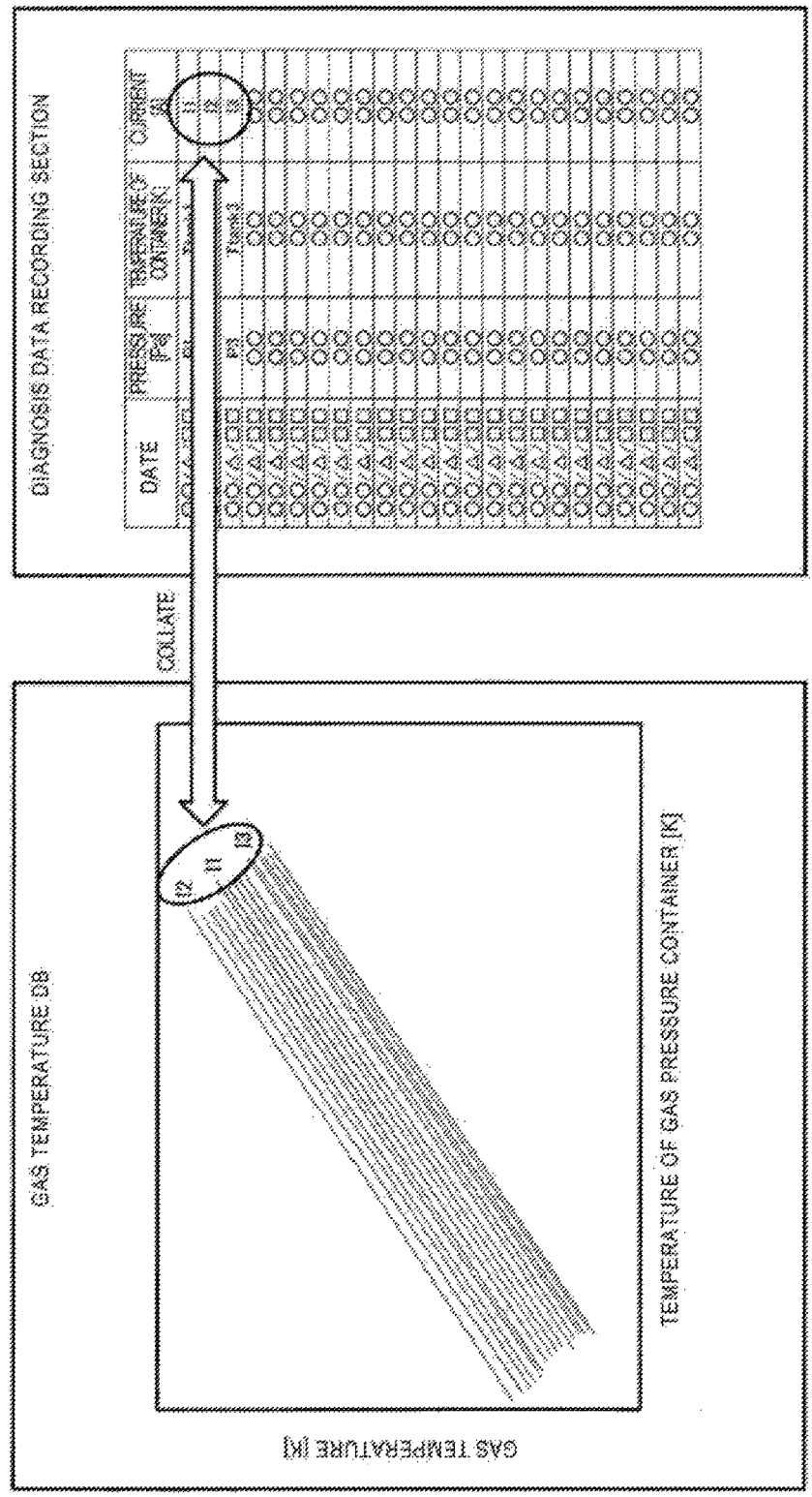
FIG. 11 is a diagram collating a current range of a current value and a gas temperature DB recorded in the diagnosis data recording section in the first example of the invention.

The gas temperature extracting section 42 collates a current range of the gas temperature DB 34 corresponding to the current value recorded in the diagnosis data recording section 41 (refer to FIG. 11). FIG. 11 is a diagram collating a current range of the current value and the gas temperature DB recorded in the diagnosis data recording section in the first example of the invention.

Step 13

Figure 12:
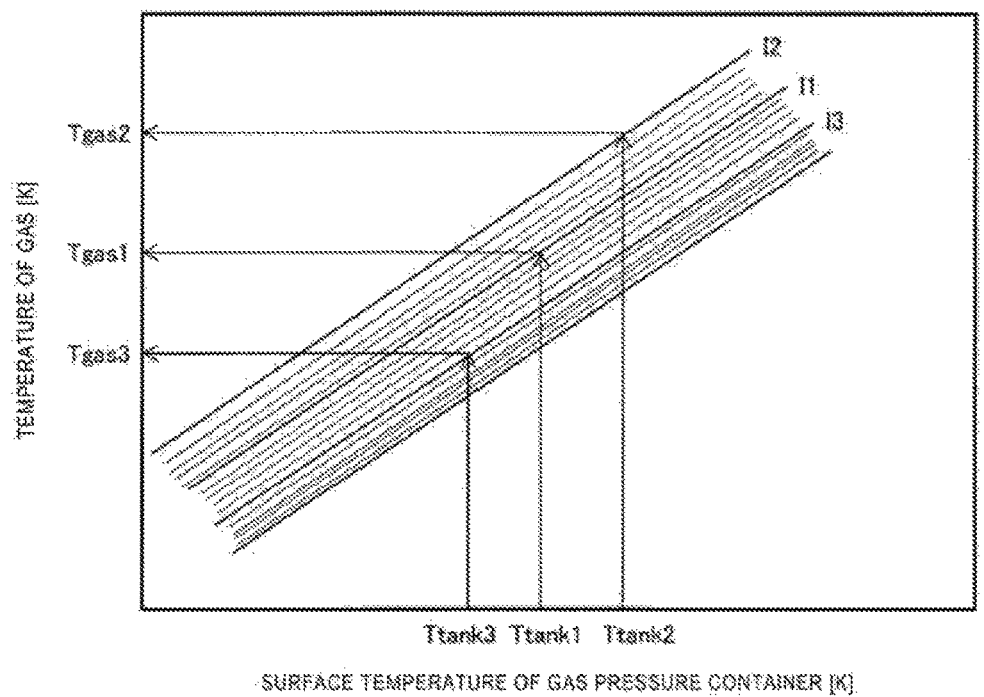
FIG. 12 is a diagram illustrating a method of obtaining a gas temperature using a correlation between a gas temperature and a surface temperature of the gas pressure containers in the first example of the invention.

The correlations between the gas temperatures of the gas temperature DB 34 and the surface temperatures of the gas pressure containers collated in Step 12 are used, as illustrated in FIG. 12, and the gas temperatures are obtained from the surface temperatures of the gas pressure containers 2a to 2c. FIG. 12 is a diagram illustrating a method of obtaining the gas temperatures by the correlations between the gas temperatures and the surface temperatures of the gas pressure containers in the first example of the invention.

As illustrated in FIG. 7, the gas temperature and the measured gas pressure are recorded in the gas temperature extracting section 42. FIG. 7 is a diagram illustrating an example of the data format recorded in the gas temperature extracting section in the first example of the invention.

Step 14

The pressure calculation section 43 corrects temperatures of the gas pressures using the calculated gas temperature. A temperature correction of the gas pressures is carried out using the state equation Beattie-Bridgeman of actual gas illustrated in Equation (1) in the same manner of Step 3. The molar capacity v of the gas is obtained using Equations (1) to (6). The calculated molar capacity and a reference temperature 20° C. (293K) are substituted in Equation (9), and thus the pressure temperature is corrected to a gas pressure $p_{20}$ in the reference temperature 20° C.

$$T_{20}=20+273[K] \quad (8)$$

$$p_{20}=(RT_{20}(v+B)-A)/v^2 \quad (9)$$

Figure 8:
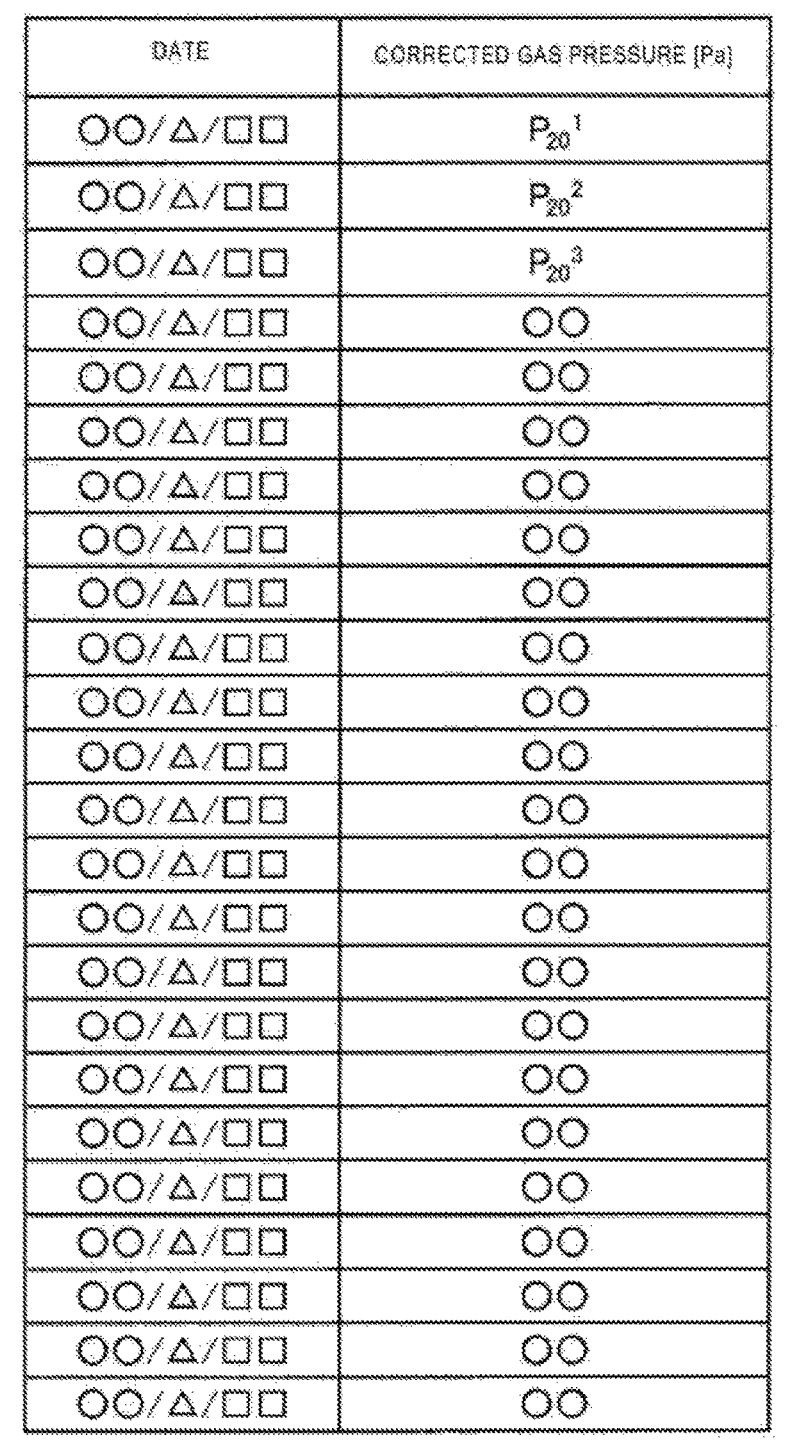

The gas pressure in which the temperature is corrected is recorded in the pressure calculation section 43 as illustrated in FIG. 8. FIG. 8 is a diagram illustrating an example of the data format recorded in the pressure calculation section in the first example of the invention.

Step 15

Figure 13:
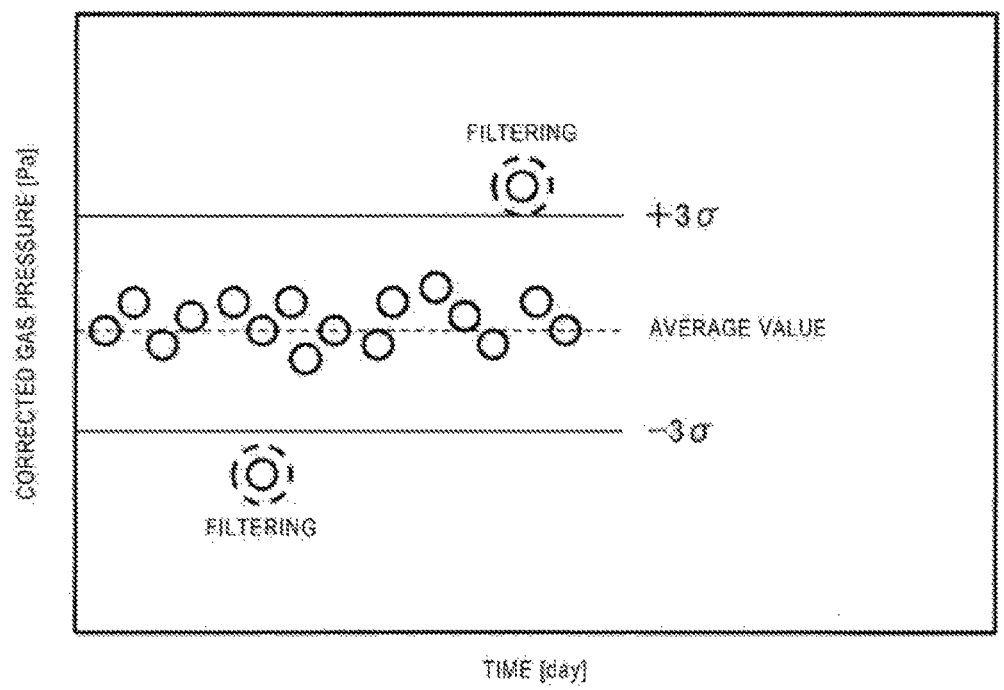
FIG. 13 is a diagram illustrating filtering of corrected gas pressure data in the first example of the invention.

An example of a change with time of a corrected gas pressure obtained in Step 14 is illustrated in FIG. 13. FIG. 13 is a diagram illustrating a filtering of the corrected gas pressure data in the first example of the invention. There is a case in which unevenness remains in the corrected gas pressure due to rapid climate change or electrical noise, or the like. Here, for example, when the verification section 44 filters data exceeding a range of three times (±3σ) of a standard deviation of the corrected gas pressure, unevenness can be suppressed.

Step 16

Figure 14:
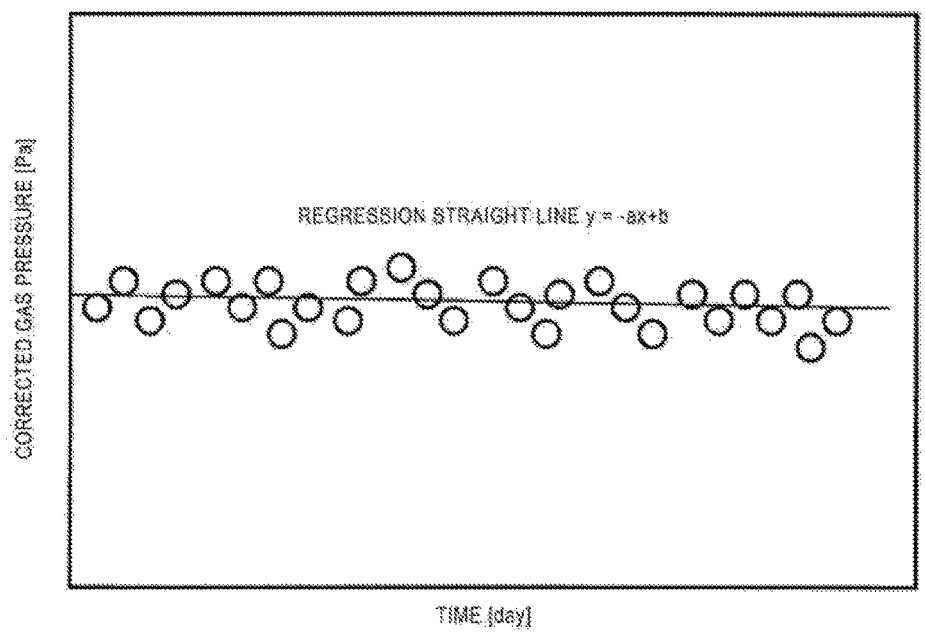
FIG. 14 is a diagram illustrating linear regression of the corrected gas pressure data in the first example of the invention.

The verification section 44 carries out measurement of whether or not the corrected gas pressure filtered in Step 15 corresponds to a gas leak equal to or more than the specific concentration. First, a change with time of the corrected gas pressure data is linear-regressed. The linear regression of the pressure data is performed by, for example, a least squares method. A specific example of the linear regression is described with reference to FIG. 14. FIG. 14 is a diagram illustrating the linear regression of the corrected gas pressure data in the first example of the invention. As illustrated in FIG. 14, a gas pressure (Y axis) with respect to a time (X axis) is plotted, and regressed to a straight line of y=−ax+b. Here, when the display section 45 displays the change with time and the regression straight line of the corrected gas pressure, a manager can easily recognize a state of the gas pressure containers 2a to 2c.

Step 17

Figure 15:
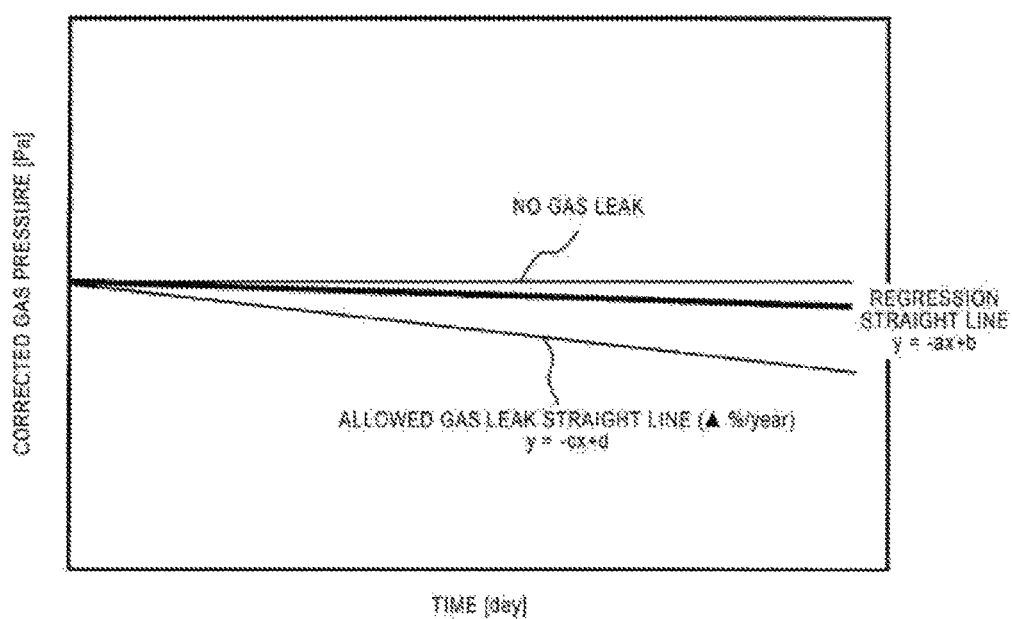
FIG. 15 is a diagram illustrating an inclination of a regression straight line of a corrected gas pressure in the first example of the invention.

After the linear regression of the pressure data is carried out in Step 16, an inclination a of the regression straight line y=−ax+b is recorded in the verification section 44 once a day. An inclination c of a straight line of an allowed gas leak concentration is stored in the verification section 44 in advance. A relationship between the inclination a and the inclination c will be described with reference to FIG. 15. FIG. 15 is a diagram illustrating the inclinations of the regression straight line of the corrected gas pressure in the first example of the invention. Moreover, in FIG. 15, a case in which the inclination a is smaller than the inclination c, that is, a case in which a leak amount is within an allowable range is illustrated. The verification section 44 compares the inclination a of the regression straight line and the inclination c of an allowable gas leak straight line updated daily, and it is determined whether or not the gas is leaked.

Step 18

In a case in which the inclination a of the regression straight line of pressure data in Step 17 is more than the inclination c of the allowed gas leak straight line, a gas leak is determined, and then an alarm is generated.

According to the first example, since the gas temperature is calculated in consideration of the energizing condition, and the gas pressure is corrected using the obtained gas temperature, the gas leak detection device, which has higher accuracy than pressure correction using the surface temperatures of the related art, can be provided.

SECOND EXAMPLE

Figure 16:
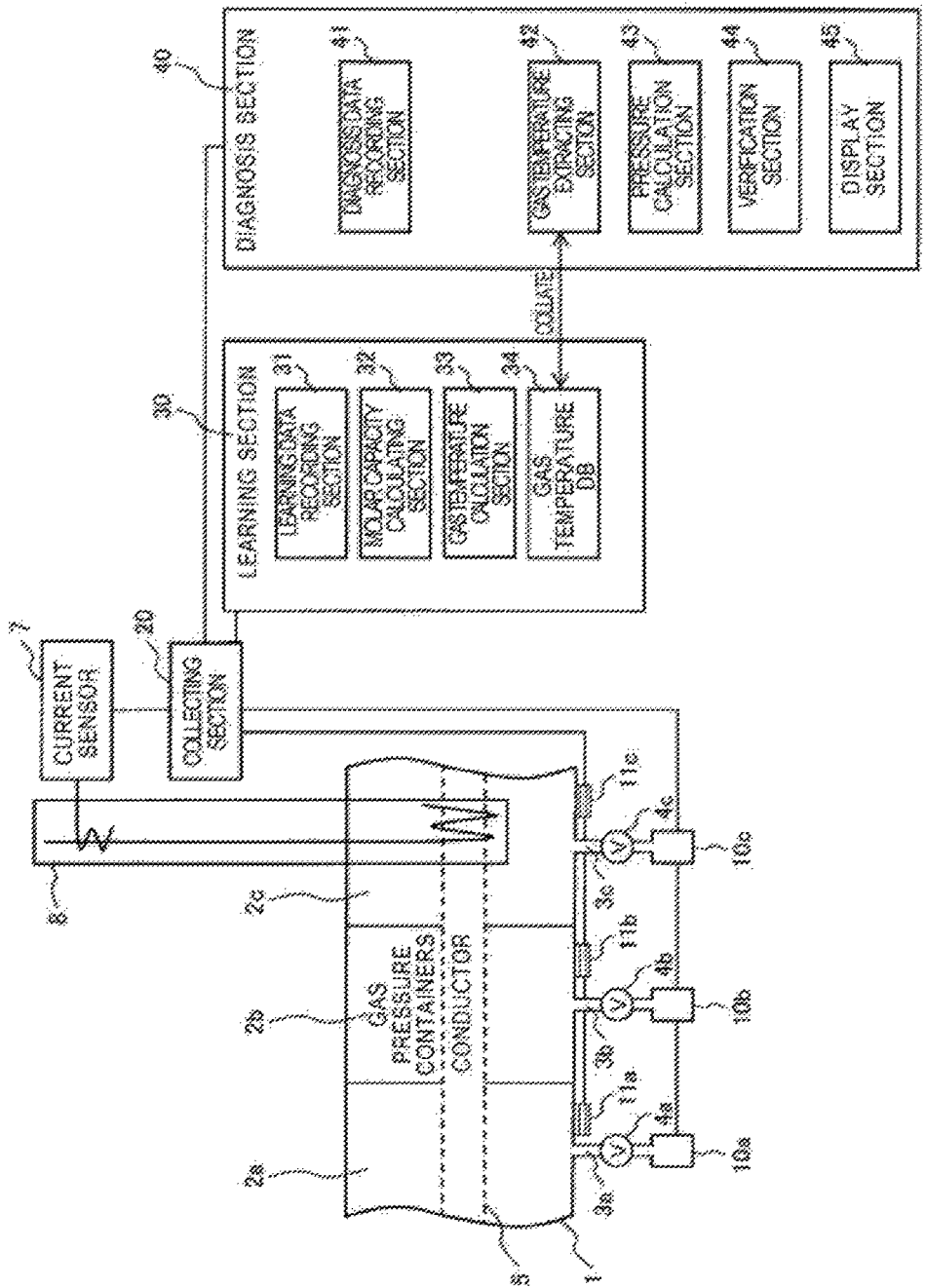
FIG. 16 is a configuration diagram of a gas leak detection device according to a second example of the invention.

FIG. 16 illustrates a second example of the invention. FIG. 16 is a configuration diagram of the gas leak detection device according to the second example of the invention.

A second example is different from the first example in the way that a current sensor 7 and a converter 8 are provided in order to obtain information of a current flowing in the conductor 5. The converter 8 is installed in the conductor 5, and is connected to the current sensor 7 by reducing a large current of a primary side flowing in the conductor 5 to a current of a secondary side. For example, in a case in which a current conversion ratio of a primary current and a secondary current is 400, the primary current 4000 A flowing in the conductor is converted to the secondary current 10 A and is input to the current sensor 7.

The current sensor 7 and the converter 8 constitute the current data capturing section 6 which captures a current value flowing in the conductor 5 to the learning section 30 and the diagnosis section 40 through the collecting section 20.

As described above, a basic structure other than the current sensor 7 and the converter 8 is the same as that of the first example, and the sensor and the converter are used to obtain information of the current, as substituting means in a case in which the current data is not captured from the protection control system 100 of the electric power substation.

Moreover, the invention is not limited to the examples described above, and various modified examples are included. For example, the examples described above have been described in detail so as to easily describe the invention, and it is not limited to an invention necessarily including all configurations described above. In addition, a part of a configuration of one example can be substituted to a configuration of the other example, and a configuration of one example can be added to a configuration of the other example.

In addition, a part of a configuration of each example can be added to the other configuration, be deleted, and be substituted.

What is claimed is:

1. A gas leak detection device used for gas insulation electric equipment in which a conductor is installed inside a gas pressure container where insulating gas is sealed, and detects a leak of the insulating gas, comprising:
    a pressure sensor that measures a gas pressure value inside the gas pressure container;
    a temperature sensor that measures an external temperature of the gas pressure container having a correlation with a gas temperature inside the gas pressure container, wherein the gas leak detection device corrects a gas pressure value measured by the pressure sensor to a gas pressure value of a reference temperature based on said external temperature measured by the temperature sensor and detects a leak of the insulating gas based on the corrected gas pressure value, and the gas leak detection device includes
    a current data capturing section that captures a current value flowing in the conductor;
    a collecting section including an A/D converter, the collecting section connected to the pressure sensor, the temperature sensor, and the current data capturing section to periodically collect data from the gas pressure sensor, the temperature sensor, and the current data capturing section;
    a learning section, configured with a recording section, molar capacity and gas temperature calculation sections, and a gas temperature database, that obtains data written by the collecting section in a learning period, the learning section having a database with a correlation between a gas temperature inside the gas pressure container and an external temperature of the gas pressure container corresponding to the current value to make database in a learning period, and
    a diagnosis section that extracts from the gas temperature database a gas temperature corresponding to the captured current value and said external temperature of the gas pressure container measured by the temperature sensor from the learning section in a diagnosis period, corrects the gas pressure value corresponding to the external temperature using the gas temperature corresponding to the captured current value to the gas pressure value of the reference temperature, and detects a leak of the insulating gas based on the corrected gas pressure value.

2. The gas leak detection device according to claim 1, wherein the diagnosis section linear-regresses the corrected gas pressure value, and determines whether or not an inclination of a regression straight line obtained by linear-regressing the corrected gas pressure value is more than an inclination of a gas leak of a specific concentration, and the leak of the insulating gas is detected.

3. The gas leak detection device according to claim 2, wherein the temperature sensor is installed in a region half of a ground side of the gas pressure container, and measures a surface temperature of the gas pressure container.

4. The gas leak detection device according to claim 3, wherein the temperature sensor is installed in a bottom portion of the gas pressure container.

5. The gas leak detection device according to claim 1, wherein the current data capturing section is constituted by a current sensor which measures current flowing in the conductor.

6. A gas leak detection method which is used for the gas leak detection device according to claim 1, wherein, after the gas pressure value measured by the pressure sensor in the diagnosis section is corrected to the gas pressure value of a reference temperature, data in which the corrected gas pressure value is more than a predetermined standard deviation is excluded by filtering, the corrected gas pressure value after filtering is linear-regressed, and it is determined whether or not gas is leaked by determining whether or not an inclination of a regression straight line obtained by linear-regressing the corrected gas pressure value is more than an inclination of a gas leak straight line of a regulated allowable concentration.

* * * * *